US010090688B2

(12) United States Patent
Houston et al.

(10) Patent No.: US 10,090,688 B2
(45) Date of Patent: *Oct. 2, 2018

(54) OVERCURRENT PROTECTION IN A BATTERY CHARGER

(71) Applicant: INTERSIL AMERICAS LLC, Milpitas, CA (US)

(72) Inventors: Michael Jason Houston, Cary, NC (US); John Stuart Kleine, Cary, NC (US); Lei Zhao, Cary, NC (US); Jia Wei, Cary, NC (US)

(73) Assignee: INTERSIL AMERICAS LLC, Milpitas, CA (US)

( * ) Notice: Subject to any disclaimer, the term of this patent is extended or adjusted under 35 U.S.C. 154(b) by 288 days.

This patent is subject to a terminal disclaimer.

(21) Appl. No.: 14/981,776

(22) Filed: Dec. 28, 2015

(65) Prior Publication Data
US 2016/0204631 A1 Jul. 14, 2016

Related U.S. Application Data

(63) Continuation-in-part of application No. 14/747,912, filed on Jun. 23, 2015, now Pat. No. 9,853,467.

(60) Provisional application No. 62/164,411, filed on May 20, 2015, provisional application No. 62/102,989, filed on Jan. 13, 2015.

(51) Int. Cl.
*H02J 7/00* (2006.01)
*H02H 3/20* (2006.01)

(52) U.S. Cl.
CPC .......... *H02J 7/0029* (2013.01); *H02H 3/202* (2013.01); *H02J 7/007* (2013.01); *H02J 2007/0039* (2013.01)

(58) Field of Classification Search
CPC .......... H02J 7/0029; H02H 3/202; H02H 3/20
USPC ......................................... 320/134; 361/91.1
See application file for complete search history.

(56) References Cited

U.S. PATENT DOCUMENTS

| 5,530,336 | A | * | 6/1996 | Eguchi | H02J 7/0013 320/118 |
|---|---|---|---|---|---|
| 6,150,796 | A | | 11/2000 | Ford | |
| 6,198,255 | B1 | * | 3/2001 | Yoshida | H02J 7/0031 320/134 |
| 6,845,023 | B2 | | 1/2005 | Philips et al. | |
| 7,030,590 | B2 | | 4/2006 | Sakakibara et al. | |
| 7,233,462 | B2 | | 6/2007 | Kanakubo | |

(Continued)

OTHER PUBLICATIONS

Castiaux et al., "Power Conditioning Units for High Power Geostationary Satellites", 1997, pp. 722-733.

(Continued)

*Primary Examiner* — M'Baye Diao
(74) *Attorney, Agent, or Firm* — Foley & Lardner LLP

(57) ABSTRACT

Systems and methods for overcurrent protection in a battery charger are provided. For example, a method for overcurrent protection may include controlling a switching regulator to direct electrical current between the switching regulator and a battery port; sensing a voltage drop that is related to the electrical current passing between the switching regulator and the battery port; applying a first ramp voltage to the sensed voltage drop generating a modified sensed voltage drop; comparing the modified sensed voltage drop against at least one reference voltage; and when the modified sensed voltage drop exceeds the at least one reference voltage, changing operation of the switching regulator to protect the battery charger from an overcurrent state.

32 Claims, 6 Drawing Sheets

(56) References Cited

U.S. PATENT DOCUMENTS

| | | | |
|---|---|---|---|
| 7,405,497 B2 | 7/2008 | Jacobs et al. | |
| 7,502,700 B2 * | 3/2009 | Iwaizono | H02J 7/0029 320/134 |
| 7,522,398 B2 | 4/2009 | Tang | |
| 7,646,574 B2 | 1/2010 | Imura | |
| 7,817,391 B2 | 10/2010 | Kimber | |
| 7,847,520 B2 | 12/2010 | Veselic et al. | |
| 8,081,410 B1 | 12/2011 | Wang et al. | |
| 8,203,314 B2 | 6/2012 | Odaohhara | |
| 8,432,656 B2 * | 4/2013 | Zambetti | H02M 3/158 323/268 |
| 8,471,530 B2 * | 6/2013 | Yoshikawa | H01M 10/486 320/134 |
| 8,525,482 B2 * | 9/2013 | Takeda | H02J 7/0029 320/127 |
| 8,860,375 B2 * | 10/2014 | Chen | H02J 7/0022 320/134 |
| 8,957,638 B2 | 2/2015 | Maetani et al. | |
| 2010/0289457 A1 | 11/2010 | Onnerud et al. | |
| 2014/0062413 A1 | 3/2014 | Kim | |
| 2014/0248802 A1 | 9/2014 | Hieda et al. | |
| 2014/0312969 A1 | 10/2014 | Hamond | |
| 2015/0280493 A1 * | 10/2015 | Cha | H02J 7/0029 307/64 |
| 2016/0204632 A1 | 7/2016 | Kleine et al. | |

OTHER PUBLICATIONS

Cheng et al., "Transient Analysis and Fault Compensation During Module Failure in Paralleled Power Modules", "IEEE Transactions on Industry Applications", Mar./Apr. 2006, pp. 591-601, vol. 42, No. 2.

Cheng et al., "Transient Analysis and Fault Compensation during Module Failure in Paralleled Power Modules", 2004, pp. 1810-1816.

Huang, "A New Control for Multi-phase Buck Converter with Fast Transient Response", 2001, pp. 273-279.

"Highly Integrated Battery Charger with Automatic Power Source Selector for Notebook Computers", May 23, 2006, pp. 1-22, Publisher: Intersil.

"2.5A Regulator with Integrated High-Side MOSFET for Sunchronous Buck or Boost Buck Converter", Apr. 25, 2013, pp. 1-22, Publisher: Intersil.

Krauthamer et al., "State-of-the Art of DC Components for Secondary Power Distribution of Space Station Freedom", "IEEE Transactions on Power Electronics", Jul. 1991, pp. 548-561, vol. 6, No. 3.

"4A, High Efficiency, Multi-Chemistry Battery Charger", 2003, pp. 1-24, Publisher: Linear Technology.

"Automotive Grade Non-Synchronous Buck Controller", Apr. 2014, pp. 1-12, Publisher: Semiconductor Components Industries, LLC.

Pei et al., "Switch Short-Circuit Fault Diagnosis and Remedial Strategy for Full-Bridge DC-DC Converters", "IEEE Transactions on Power Electronics", Feb. 2015, pp. 996-1004, vol. 30, No. 2.

Yang, "Analysis and Evaluation of Over Current Protection for DC to DC PWM Converters", "The 4th International Power Electronics and Motion Control Conference", 2004, pp. 149-153, vol. 1, No. 1.

United States Patent and Trademark Office, "Office Action", "from U.S. Appl. No. 14/747,912", dated Feb. 3, 2017, pp. 1-17, Published in: US.

* cited by examiner

OVERCURRENT PROTECTION IN A BATTERY CHARGER

CROSS REFERENCE TO RELATED APPLICATIONS

This application is a continuation-in-part (CIP) of U.S. patent application Ser. No. 14/747,912, entitled "OVERCURRENT PROTECTION IN A BATTERY CHARGER" filed Jun. 23, 2015, which is incorporated herein by reference.

This application claims the benefit of and priority to U.S. Provisional Application No. 62/164,411, entitled "OVERCURRENT PROTECTION IN A BATTERY CHARGER" and filed on May 20, 2015, and to U.S. Provisional Application No. 62/102,989, entitled "SYSTEMS AND METHODS FOR PROVIDING PROTECTION AGAINST EXCESSIVE CURRENT IN A BATTERY CHARGER" and filed on Jan. 13, 2015, the disclosures of which are incorporated herein by reference.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
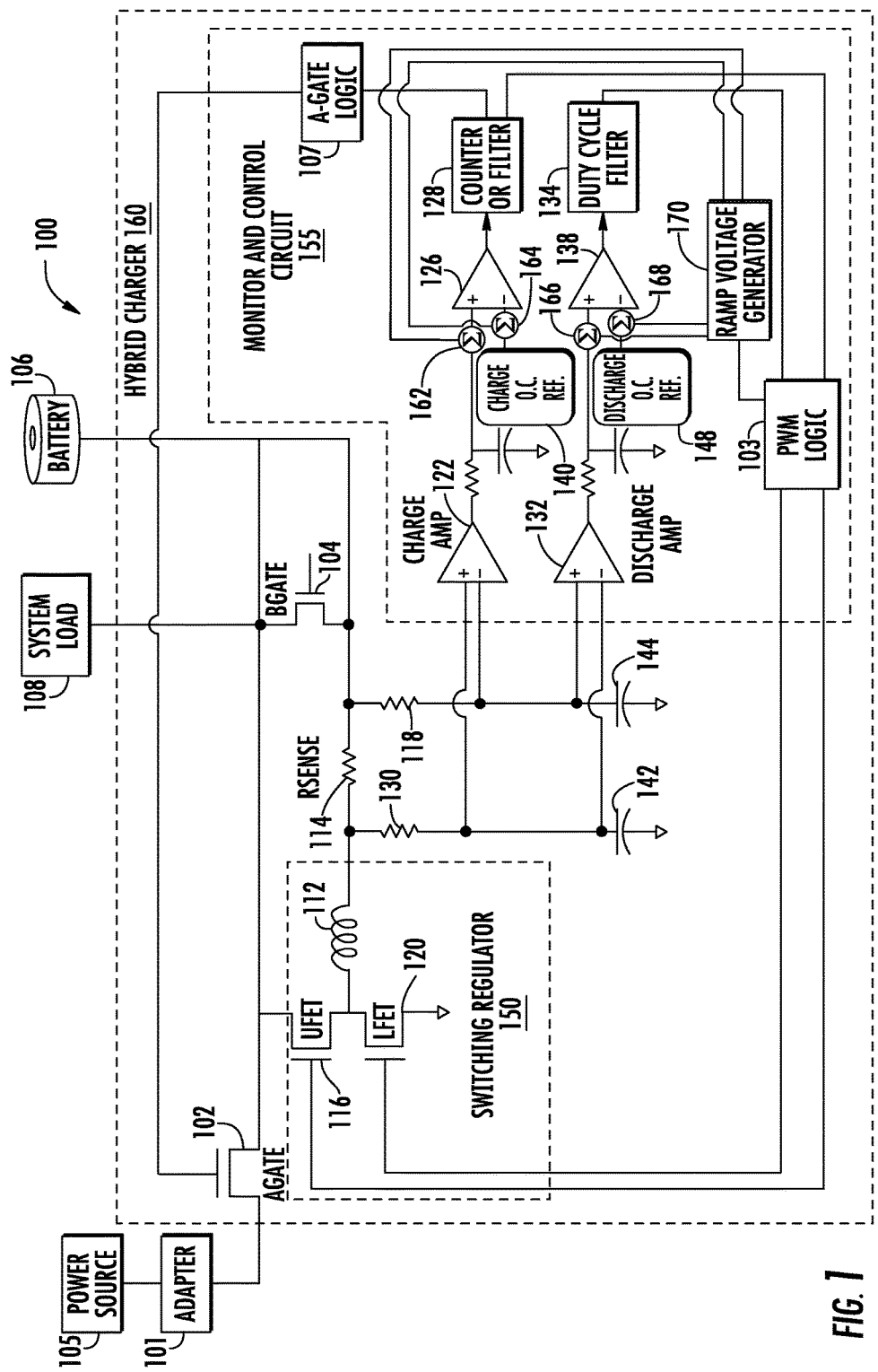
FIG. 1 is a schematic drawing of a portion of a hybrid battery charger in one embodiment described in the present disclosure.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Embodiments described herein provide a battery charger that prevents excessive current flow in the charger due to defects in certain components of the charger. Such excessive current flow could damage other components of a system that uses the charger. The excessive current flow could be caused by defects or failures in either a field effect transistor (FET), an inductor, or other mounting-related defects in the battery charger. To prevent excessive current from arising, a battery charging or discharging current may be monitored across a sense resistor to determine when excessive current is flowing. Further, the circuit may respond to the excessive current by eliminating the current path if it is determined that the excessive current exceeds defined limits.

Embodiments of the present invention apply to a variety of battery chargers. The battery chargers described herein receives power from a connected adapter and uses the power provided by the adapter to both: (1) power a system load and (2) charge a battery, where the system load may be a computer or any device that is able to draw power from a rechargeable battery to operate. As specific examples, FIGS. 1 and 2 below, illustrate applications to hybrid chargers (FIG. 1) and narrow voltage direct current (NVDC) chargers. Each of these chargers and the associated circuitry and methods for preventing excessive current are described in detail below.

FIG. 1 is a diagram of a system 100 that implements a hybrid charger 160 that prevents excessive current from flowing within the charger 160 and damaging components in the charger 160 or components connected to the charger 160. A hybrid charger 160, as referred to herein, is a charger that monitors and controls the current provided through a battery port to a battery 106 and through a system load port to a system load 108. The charger 160 is coupled between an adapter 101, the system load 108, and the battery 106. The adapter 101 receives current from a power source 105 and adapts the current to provide a particular power signal suited to drive the system load 108 and to recharge the battery 106.

The adapter 101 connects to the charger 160 through an AGATE 102 in the charger 160. The AGATE 102 functions as a switch that when turned on allows the adapter 101 to provide current to the charger 160. For example, the AGATE 102 may be a controllable device, known to one having skill in the art, capable of providing switching functionality such as a field effect transistor or other types of switching devices. As the AGATE 102 provides an example of a switching device and other switching devices are herein contemplated, the AGATE 102 is referred to hereafter as an adapter switch 102. When the adapter switch 102 is turned off, the adapter 101 is unable to provide current to the charger 160. In certain embodiments described herein, the adapter switch 102 may also be referred to as an adapter switch. In certain implementations, the adapter switch 102 is controlled by an AGATE logic 107 (referred to hereafter as adapter switch logic 107) that controls whether or not current flows through the adapter switch 102. The adapter switch logic 107 may also be referred to herein as the adapter switch logic. When electricity flows through the adapter switch 102 the electrical current may flow directly to the system load 108. The system load 108 may be inside of a notebook, a laptop, a tablet, smartphone or other electronic device that is capable of running off a rechargeable battery such as the battery 106.

The system load 108 may draw varying amounts of current to operate. For example, at times the system load 108 may use less than the current provided by the adapter 101 through the adapter switch 102. When the system load 108 is using less than the current provided to the charger 160, a portion of the current provided may be directed to the battery 106 to recharge the battery 106. Also, at other times, the system load 108 may require more current than what is provided by the adapter 101 through the adapter switch 102. When the system load 108 needs more current in addition to the current provided from the adapter 101, the battery 106 may provide additional current to the system load 108.

To control the use of current by the system load 108 and the battery 106, the charger 160 may include a switching regulator 150. To control the direction of the current the switching regulator 150 may include an upper switch (UFET) 116 and a lower switch (LFET) 120. When there is no current provided by the adapter 101 through the adapter switch 102, the battery 106 may provide all the current consumed by the system load 108 through a BGATE 104, like the adapter switch 102, the BGATE 104 is also a controllable switching device and, accordingly, is referred to herein as a battery switch 104.

In at least certain implementations, as stated above and described herein, the use of the current provided by the adapter 101, stored or provided by the battery 106, and consumed by the system load 108 is controlled in part by the UFET 116 and the LFET 120 of the switching regulator 150. The UFET 116 and LFET 120 are transistors, such as power transistors or FET transistors, which are able to turn on and off as controlled by a pulse width modulation (PWM) feedback signal produced by PWM logic 103. Further, other types of switching devices known to one having skill in the art are also contemplated. The PWM logic 103 is part of a monitor and control circuit 155 that monitors the operation of the switching regulator 150 and sends control signals to the UFET 116 and LFET 120 in the switching regulator 150. When current is provided from the adapter 101 to the system load 108, the control signals provided by the PWM logic 103 control when the UFET 116 and LFET 120 allow a portion of the current provided from the adapter 101 to pass from the adapter 101 to the battery 106. Also, when the system load 108 uses more current than what is provided by the adapter 101, the switching regulator 150 may also direct the battery 106 to provide additional current to the system load 108, supplementing the current provided from the adapter 101. When the battery 106 provides supplemental current to the current provided from the adapter 101, it may be referred to as a boost condition and the PWM logic 103 controlling the switching regulator 150 to control the current provided from the battery when the system 100 is in a boost condition. For the battery 106 to provide current to the system load 108, the PWM logic 103 controls the UFET 116 and LFET 120 to provide current from the battery 106 to the system load 108. In certain implementations, as understood by one having skill in the art, the PWM logic 103 may also receive feedback signals that provide information about the voltage being provided to the battery 106 and being used by the system load 108. Further, the system load 108 may also provide information regarding the need for increased current to the PWM logic 103.

In at least one further implementation, the switching regulator 150 also includes an inductor 112. When a PWM signal from the PWM logic 103 turns on the UFET 116 such that current flows from the adapter 101 to the battery 106, an inductor 112 initially stores energy as the current increases from the adapter switch 102. Before the current increases, as provided by the adapter switch 102 through the inductor 112 and before the inductor 112 has stored the energy that the inductor 112 is capable of storing, such that the current provided through the switching regulator 150 becomes excessive for subsequently connected devices, a PWM signal from the PWM logic 103 switches the UFET 116 to an off state. The inductor 112 initially protects the battery 106 from damage that may occur if the initial current from the adapter 101 were of too large a magnitude to be consumed directly by the battery 106. In particular, the inductor 112 protects the battery 106 from the current initially provided from the adapter 101 from being directly consumed by the battery 106 at the moment a PWM signal from the PWM logic 103 switches the UFET 116 to an on state.

In certain embodiments, the UFET 116 and/or the inductor 112 may become damaged such that either the UFET 116 or the inductor 112 acts as a short circuit. When the UFET 116 acts as a short circuit the current provided by the adapter 101 runs directly to the inductor 112 and the PWM logic 103 becomes unable to turn off the UFET 116. Accordingly, current from the adapter 101 runs continuously into the inductor 112 such that the inductor 112 is not able to store energy provided from the adapter. As the UFET 116 and the inductor 112 are short circuited, the only resistance between the adapter switch 102 and the battery is a sense resistor 114. The impedance of the sense resistor 114 may be significantly less than the impedance of the system load 108, accordingly, a high current may develop through the sense resistor 114 that may be capable of damaging the battery 106 or other components. Similarly, when the inductor 112 is short circuited, when the PWM logic 103 turns on the UFET 116, the current from the adapter switch 102 may likewise flow directly into the battery 106 at a current sufficiently high enough to damage the battery 106 or other components.

To prevent damage to charger components and components connected to the charger 160, the monitor and control circuit 155 includes the comparators 126 and 138 that compare the voltage drop across the sense resistor 114 against overcurrent thresholds. For example, when the current is flowing from the adapter 101 to the battery 106, a charge amplifier 122 combined with a charge threshold comparator 126 function to compare the voltage drop across the sense resistor 114 against a charge overcurrent reference voltage 140. In certain implementations, the charge amplifier 122 receives two inputs, one input from a sense resistor input node and a switching regulator input node, where the sense resistor input node receives a sense resistor voltage after the current has passed through the sense resistor 114 and the switching regulator input node receives a switching regulator voltage after the current has passed through the switching regulator 150 but before the current passes through the sense resistor 114. Further, the charge amplifier 122 provides a charge output signal that is proportional to the magnitude of the voltage drop across the sense resistor 114 which is proportional with the current charging the battery 106. The charge output signal then is compared against a charge overcurrent reference voltage 140 by the charge threshold comparator 126. If the charge output signal is higher than the charge overcurrent reference voltage 140, the charge threshold comparator 126 then provides a charge comparison signal to a counter/filter 128, where the charge comparison signal indicates whether the charge current across the sense resistor 114 is too high such that the current indicates that an over-current situation is present.

In at least one exemplary implementation, before the charge output signal is compared against the charge overcurrent reference voltage 140, the charge output signal may pass through a summer 162. The summer adds a ramp voltage to the charge output signal, where the ramp voltage is provided by a ramp voltage generator 170. The addition of the ramp voltage improves stability by reconstructing fast inductor current information. The addition of the ramp voltage improves stability because the charge output signal is bandwidth limited when compared to the bandwidth of the current passing through the inductor 112, hence the addition of the ramp voltage reconstructs some of the information that is lost due to the bandwidth limitations of the current sensed through the sense resistor 114, amplified by the charge amplifier 122 and filtered by R-C filters coupled to the input and/or output of the charge amplifier 122. In at least one embodiment, the ramp voltage generator 170 is controlled by the PWM logic 103. Further, the charge overcurrent reference voltage 140 may also pass through a reference summer 164 that adds the ramp voltage to the charge overcurrent reference voltage 140. The charge overcurrent reference voltage 140 may pass through the reference summer 164 to offset the charge overcurrent reference voltage 140 by the predicted amplitude of the signal produced by the summer 162. Thus, the addition of the ramp voltage to the charge overcurrent reference voltage 140 may contribute to an improvement in accuracy. In some embodiments the ramp voltages generated by ramp voltage generator 170 emulate the ramp current waveform of the inductor current of inductor 112. In some embodiments the amplitude, slope and/or the ramping direction of the ramp voltages provided by ramp voltage generator 170 to summers 162 and 164 are different. In some embodiments one or both of the ramp voltages provided by the ramp voltage generator 170 have zero amplitude.

In a further embodiment, when the current is flowing from the battery 106 across the sense resistor 114 when the battery 106 is discharging, a discharge amplifier 132 combined with a discharge threshold comparator 138 function to compare the voltage drop across the sense resistor 114 against a discharge overcurrent reference voltage 148. In certain implementations, the discharge amplifier 132 receives two inputs, one input from a sense resistor input node and a switching regulator input node, where the switch regulator input node receives the signal after the current has passed through the sense resistor 114 but before the switching regulator 150 and the sense resistor input node receives the signal before the current has passed through the sense resistor 114. Further, the discharge amplifier 132 provides a discharge output signal that is proportional to the magnitude of the voltage drop across the sense resistor 114 which is proportional with the battery discharge current. The discharge output signal then is compared against a discharge overcurrent reference voltage 148. If the discharge output signal is higher than the discharge overcurrent reference voltage 148, the discharge threshold comparator 138 may then provide a discharge comparison signal to an optional duty cycle filter 134, where the discharge comparison signal indicates whether the current across the sense resistor 114 is too high such that the current indicates that an over-current situation is present.

In at least one exemplary implementation, before the discharge output signal is compared against the discharge overcurrent reference voltage 148, the discharge output signal may pass through a summer 166. The summer 166 adds the ramp voltage to the discharge output signal, where the ramp voltage is provided by a ramp voltage generator 170. The summer 166 improves stability by reconstructing fast inductor current information. The addition of the ramp voltage likewise improves stability for the same reasons as described above with regards to summer 162. In particular, the stability is improved because the discharge output signal is bandwidth limited when compared to the bandwidth of the current passing through the inductor 112, hence the addition of the ramp voltage reconstructs some of the information that is lost due to the bandwidth limitations of the current sensed through the sense resistor 114, amplified by the discharge amplifier 122 and filtered by R-C filters coupled to the input and/or output of the charge amplifier 132. Further, the discharge overcurrent reference voltage 148 may also pass through a reference summer 168. The discharge overcurrent reference voltage 148 may pass through the reference summer 168 to offset the discharge overcurrent reference voltage 148 by the predicted amplitude of the signal produced by the summer 166. Thus, the addition of the reference ramp voltage to the discharge overcurrent reference voltage 148 may contribute to an improvement in accuracy. In some embodiments the ramp voltages generated by ramp voltage generator 170 emulate the ramp current waveform of the inductor current of inductor 112. In some embodiments the amplitude, slope and/or the ramping direction of the ramp voltages provided by ramp voltage generator 170 to summers 166 and 168 are different. In some embodiments one or both of the ramp voltages provided by the ramp voltage generator 170 have zero amplitude.

When either the counter/filter 128 or the duty cycle filter 134 detects that an overcurrent condition has occurred, the counter/filter 128 or the duty cycle filter 134 may send a signal indicating the overcurrent condition to one or both of the PWM logic 103 and the adapter switch logic 107. When the signal indicating the overcurrent condition is provided by the counter/filter 128, the charger 160 may turn off the adapter switch 102 through a control signal provided by adapter switch logic 107. When the adapter switch 102 is turned off, the system load 108 will draw current from the battery 106 through battery switch 104, which may eventually drain the battery 106 unless the adapter 101 provides further current. In some implementations, after being turned off, the adapter switch logic 107 may direct the adapter switch 102 to turn on allowing the current through the adapter switch 102 to gradually increase until it operates normally or it redevelops an overcurrent condition. If an overcurrent condition redevelops, the adapter switch logic 107 may direct the adapter switch 102 to turn off whereupon it may attempt to turn on the adapter switch 102 again or it may leave the adapter switch 102 in an off state.

In another implementation, the counter/filter 128 may provide the signal indicating the overcurrent condition to the PWM logic 103. In this case, the PWM logic 103 may eliminate the current path through the UFET 116 by turning the UFET 116 off. The threshold at which an over charge condition is detected may be programmable. Further, there may be a programmable duration of time in which the counter/filter 128 consistently receives a comparison signal that indicates an overcurrent state. Alternatively, there may be a programmable number of comparisons in which a number of overcurrent comparisons are registered by the counter/filter 128 before the counter/filter 128 sends a signal to disable either the PWM logic 103 or the adapter switch logic 107. For example, each time the counter/filter 128 receives a comparison signal indicating an overcurrent condition, a counter is incremented until the programmed number of comparisons is reached. In certain implementations, the counter/filter 128 may be cleared or reset periodically to prevent sporadic events from accumulating and resulting in a raised fault condition.

As described above, a fault condition may be detected by the charge threshold comparator 126 in different situations. For example, when the UFET 116 is defective or shorted, the adapter switch 102 may turn on and a current path may be established through the shorted UFET 116 to the battery 106. In certain implementations, the adapter switch logic 107 may gradually increase the current allowed through the adapter switch 102 such that, if the UFET 116 is defective, the overcurrent condition may be detected before the current becomes sufficiently high enough to damage components. Further, an undervalued or shorted inductor 112 may also result in a fault condition. For example, if the inductor 112 is damaged, when the PWM logic 103 turns on the UFET 116 an excessively large current spike may pass through the sense-resistor 114, which will exceed the current threshold. In at least one implementation, to enhance the sensitivity when detecting a defective-UFET 116, a filter-to-ground may be added with an imbalance on the battery-side of the sense-resistor. For example, as shown in charger 160, separate filters to ground are placed on each side of the sense resistor 114. The filter before the sense resistor 114 is formed by resistor 130 and capacitor 142 and the filter after the sense resistor 114 is formed by resistor 118 and capacitor 144. The filters suppress noise and provide filtering control for the monitor and control circuit 155. Further, the time constants may be different from one another to increase sensitivity to excessive currents. In particular the filter connected to the battery side of the sense resistor 114 may have a larger time constant to increase sensitivity. The desired sensitivity may be balanced with the noise suppression and filtering control constraints.

In certain implementations, the PWM logic 103 is a buck or boost converter, as such the PWM logic 103 may alternately drive the LFET 120 and the UFET 116, which may cause the battery 106 to discharge when in a boost mode. The battery charger 160 may pull current from the battery 106 when connected to the adapter 101 when the system load 108 uses more current than can be provided by the adapter 101. As stated above, this may be referred to as a boost condition as the battery boosts the current provided to the system load 108. However, excessive battery-discharge current may occur when entering boost mode. For example, when in boost mode, the battery 106 is able to provide some of the current to the system load 108. As the battery 106 becomes discharged the voltage that the battery 106 is able to provide decreases, which then results in larger battery-current to support the current used by the system load 108. Accordingly, a highly discharged battery 108 may result in a high current that exceeds the allowed discharge current. In at least one example of the high current being discharged from the battery 106, a highly discharged battery 106 may only be able to provide one volt to a system load 108 consuming 80 watts of power. To meet the power needs of the system load 108, a current of 80 amps from the battery 106 would be needed to provide the 80 watts of power from a 1 volt power source. The 80 amps of provided current may exceed the allowed discharge current. Also, the battery discharge current may become excessively high when the inductor 112 is either shorted or undervalued. In boost mode, as the PWM logic 103 drives the LFET 120, a low-valued or shorted inductor 112 will create an excessively large discharge-current spike through the sense-resistor 114, which may exceed the current threshold, passively damaging the LFET 120 and other components.

As described above, the discharge threshold comparator 138 may be used to compare the voltage drop across the sense resistor 114 against a discharge overcurrent reference voltage 148. The discharge comparison signal from the discharge threshold comparator 138 may then be used to alter the PWM signal from the PWM logic 103 before the battery discharge current is able to damage components in the battery charger 160. For example, the discharge amplifier 132 provides a discharge output signal to the discharge threshold comparator 138 proportional to the voltage drop across the sense resistor 114. The discharge threshold comparator 138 then compares the discharge output signal against the discharge overcurrent reference voltage 148. The result of the comparison may or may not be filtered by the duty cycle filter 134. In certain implementations, the output from the discharge threshold comparator 138 may directly stop the PWM logic 103 from driving the LFET 120. Accordingly, where the discharge comparison signal is provided directly to the PWM logic 103 and the PWM logic 103 turns off the LFET 120, the PWM logic 103 will turn off the LFET 120 based on the peak of the battery discharge current over the sense resistor 114. Alternatively, the output from the discharge threshold comparator 138 may be filtered by a duty cycle filter 134, which provides a termination signal to the PWM logic 103 when the duty cycle of the comparator exceeds a specified duty cycle value. The termination signal is a signal that instructs the PWM logic 103 to control the switching regulator 150 such that current does not flow from the battery to the switching regulator. For example, the duty cycle filter 134 may provide a termination signal when the duty cycle of the discharge comparison signal is at 50%, which indicates that the termination signal will be sent when the average value of the discharge output signal exceeds the discharge overcurrent reference voltage 148. In alternative embodiments, the duty cycle filter 134 may provide a termination signal when the duty cycle for the discharge comparison signal is less than 50%, particularly if a faster response to an overcurrent situation is desired. Also the duty cycle filter 134 may provide a termination signal when the duty cycle for the discharge comparison signal is greater than 50%, for example, when multiple duty cycle levels are detected, the duty cycle filter 134 may detect the 50% duty cycle and then may send the termination signal when the duty cycle filter 134 detects a signal a certain percentage above 50%. Accordingly, the charger 160 may prevent excessive discharge current from the battery 106 from developing.

In certain implementations, the monitor and control circuit 155 is an integrated circuit that is comprised of the comparators 122, 126, 132, and 138; the adapter switch logic 107; the PWM logic 103; the counter/filter 128; and the duty cycle filter 134. In alternative implementations, other components within the hybrid charger 160 may form a part of the monitor and control circuit 155 with the exception of the inductor 112.

Figure 2:
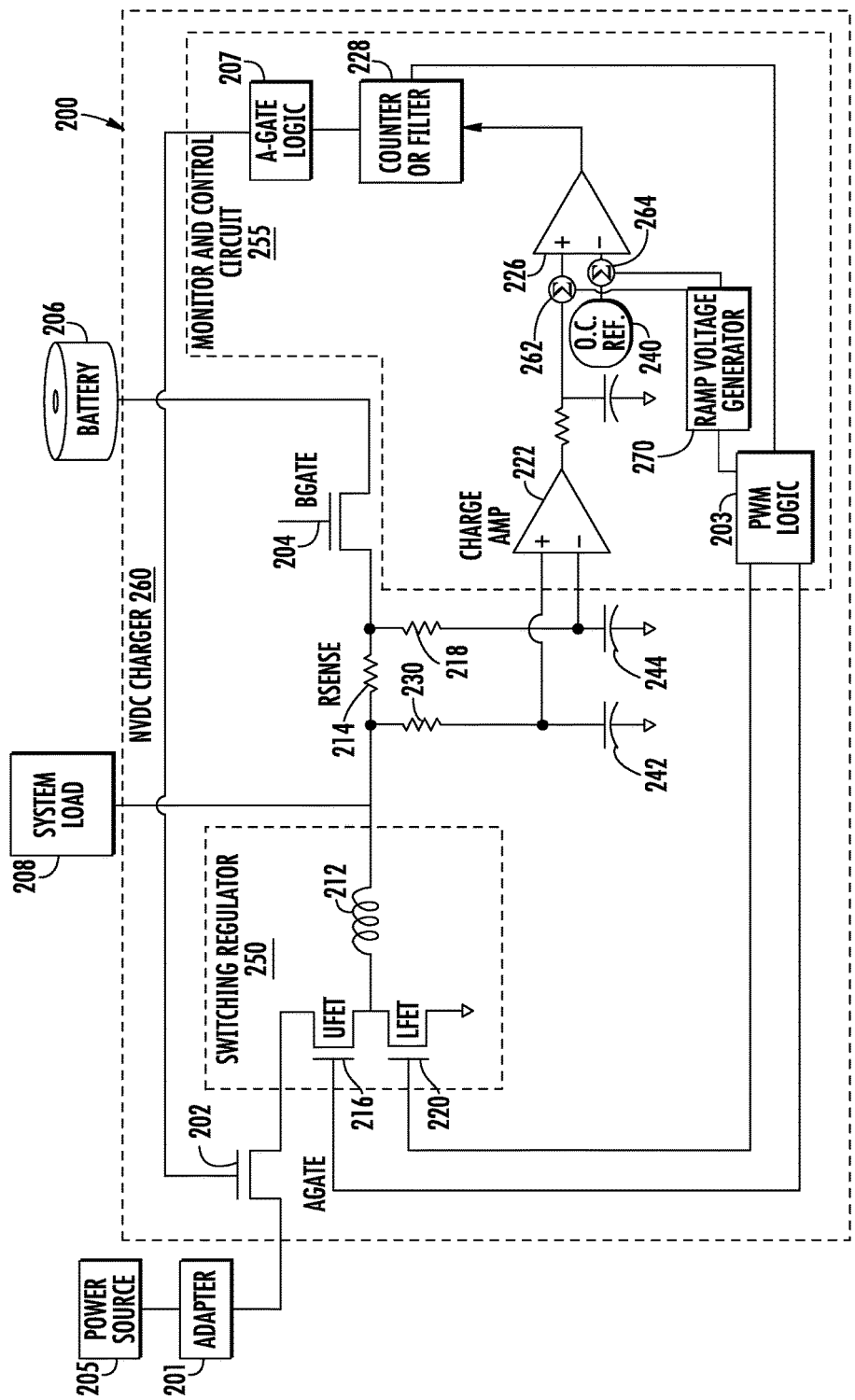
FIG. 2 is a schematic drawing of a portion of a narrow voltage direct current (NVDC) charger in one embodiment described in the present disclosure.

FIG. 2 is a schematic of a system 200 implementing a narrow voltage direct current (NVDC) charger 260. An NVDC charter 260 is a battery charger that monitors and controls the charging of a battery 206 and the provision of current to a system load 208. Many of the components of the NVDC charger 260 function similarly to their counterpart components described above with respect to the hybrid charger 160 in FIG. 1. However, in contrast to charger 160, the system load 208 is connected between the inductor 212 and the sense resistor 214 and the battery 206 is only able to receive or provide current when the battery switch 204 is activated. Further, a monitor and control circuit 255, which monitors and controls the operation of the switching regulator 250, is only able to sense overcurrent when the battery 206 is charging as the battery charger 260 does not support a boost configuration as explained above.

In one implementation, the NVDC charger 260 may have a defective or shorted UFET 216. The battery switch 204 may be on prior to adapter switch 202 being turned on. In order for the battery 206 to support the system load 208, the battery switch 204 may be turned on even if not needed for the system load 208 when the adapter switch 202, connected to the adapter 201, is turned on to allow the detection of a shorted UFET 216. If a shorted UFET 216 is present, and the battery switch 204 is turned on when the adapter 201 is providing full current, a dangerous battery charging current may occur that may potentially damage the battery 206. Alternatively, the NVDC charger 260 may have an undervalued or shorted inductor 212. If the battery switch 204 is turned on, A PWM signal from the PWM logic 203 that drives the UFET 216 or the LFET 220 may create an excessively large current spike through the sense-resistor 214, which may exceed the current threshold.

The NVDC charger 260 detects excessive current in much the same way as does the hybrid charger 160 of FIG. 1. To prevent damage to charger components and components connected to the charger 260, the monitor and control circuit 255 includes the sense resistor 114 and comparators that compare the voltage drop across the sense resistor 214 against an overcurrent reference voltage. For example, when the current is flowing from the adapter 201 through the adapter switch 202, a charge amplifier 222 combined with a charge threshold comparator 226 function to compare the voltage drop across the sense resistor 214 against a charge overcurrent reference voltage 240. In certain implementations, the charge amplifier 222 provides a charge output signal that is proportional to the magnitude of the voltage drop across the sense resistor 214. The charge output signal then is compared against a charge overcurrent reference voltage 240 by a charge threshold comparator 226. If the charge output signal is higher than the charge overcurrent reference voltage 240, the charge threshold comparator 226 then provides a charge comparison signal to a counter/filter 228, where the charge comparison signal indicates whether the current across the sense resistor 214 is too high such that the current indicates that an overcurrent situation is present.

In at least one exemplary implementation, before the charge output signal is compared against the charge overcurrent reference voltage 240, the charge output signal may pass through a summer 262. The summer 262 adds a ramp voltage to the charge output signal, where the ramp voltage is provided by a ramp voltage generator 270. The addition of the ramp voltage improves stability by reconstructing fast inductor information. Further, the stability improves because the charge output signal is bandwidth limited when compared to the bandwidth of the current passing through the inductor 212, hence the addition of the ramp voltage reconstructs some of the information that is lost due the bandwidth limitations of the current sensed through the sense resistor 214, amplified by the charge amplifier 222 and filtered by R-C filters coupled to the input and/or output of the charge amplifier 222. In at least one implementation, the ramp voltage generator 270 is controlled by the PWM logic 103. Further, the charge overcurrent reference voltage 240 may also pass through a reference summer 264 that adds the ramp voltage to the charge overcurrent reference voltage 140. The charge overcurrent reference voltage 240 may pass through the reference summer 264 to offset the charge overcurrent reference voltage 240 by the predicted amplitude of the signal produced by the summer 262. Thus, the addition of the reference ramp voltage to the charge overcurrent reference voltage 240 may contribute to an improvement in accuracy. In some embodiments the ramp voltages generated by ramp voltage generator 270 emulate the ramp current waveform of the inductor current of inductor 212. In some embodiments the amplitude, slope and/or the ramping direction of the ramp voltages provided by ramp voltage generator 270 to summers 262 and 264 are different. In some embodiments one or both of the ramp voltages provided by the ramp voltage generator 270 have zero amplitude.

When the counter/filter 226 detects that an overcurrent condition has occurred, the counter/filter 226 may send a signal indicating the overcurrent condition to one or both of the PWM logic 203 and the adapter switch logic 207. When the signal indicating the overcurrent condition is provided by the counter/filter 228, the charger 260 may turn off the adapter switch 202 through a control signal provided by adapter switch logic 207. When the adapter switch 202 is turned off, the system load 208 will draw current from the battery 206, which may eventually drain the battery 206 unless the adapter 201 provides further current. In some implementations, after being turned off, the adapter switch logic 207 may direct the adapter switch 202 to turn on allowing the current through the adapter switch 202 to gradually increase until it operates normally or it redevelops an overcurrent condition. If an overcurrent condition redevelops, the adapter switch logic 207 may direct the adapter switch 202 to turn off whereupon it may attempt to turn on the adapter switch 202 again or it may leave the adapter switch 202 in an off state. In another implementation, the PWM counter/filter 228 may provide the signal indicating the overcurrent condition to the PWM logic 203, whereupon the PWM logic 203 may eliminate the current path through the UFET 216 by turning the UFET 216 off. The threshold at which an over charge condition is detected may be programmable, and there may be a minimum duration and/or number of fault events required before action is taken as counted by the counter/filter 228, by the PWM logic 203, or the adapter switch logic 207. In certain implementations, the counter/filter 228 may be cleared periodically to prevent sporadic events from accumulating and resulting in a raised fault condition.

Figure 3:
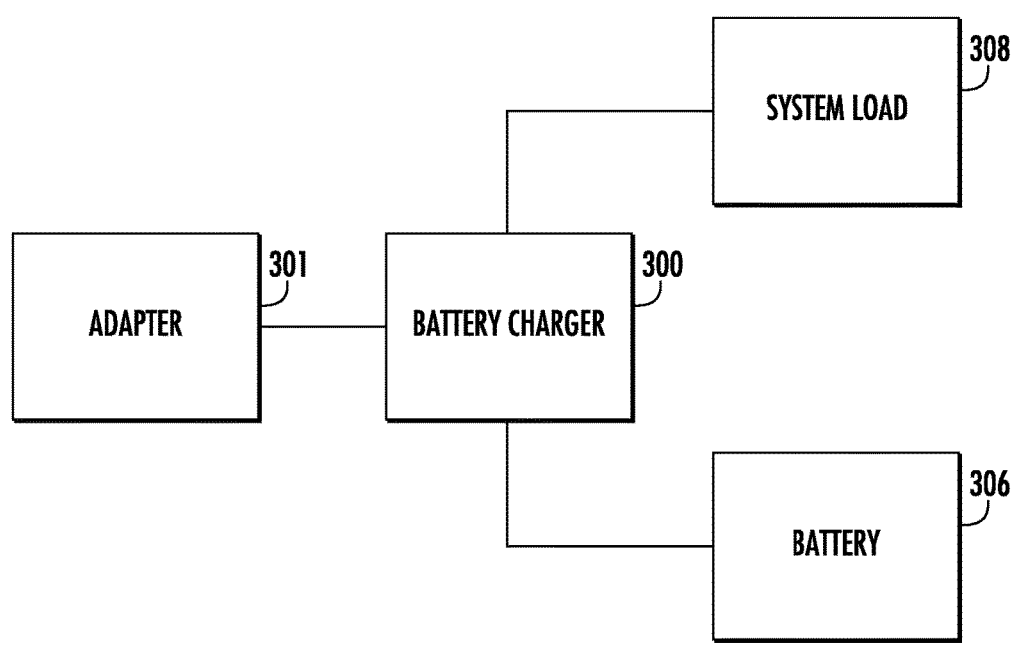
FIG. 3 is a block diagram of a system for providing rechargeable battery power to a system load in one embodiment described in the present disclosure.

FIG. 3 is a block diagram of a system comprising one of the battery chargers illustrated above in either FIG. 1 or FIG. 2. For example, the battery charger 300 is coupled between an adapter 301, a system load 308, and a battery 306. The battery charger 300 controls the current received from the adapter 301 and directs the current to the system load 308 and/or the battery 306. In certain implementations, the system load 308 may be a notebook computer, a tablet, a phone, or other electronic device that is capable of running on current provided by a rechargeable battery. In certain implementations, the battery charger 300, battery 306, and system load 308 are part of the same device, such as a notebook computer. In alternative implementations, the battery charger 300, battery 306, and system load 308 are separate components.

Figure 4:
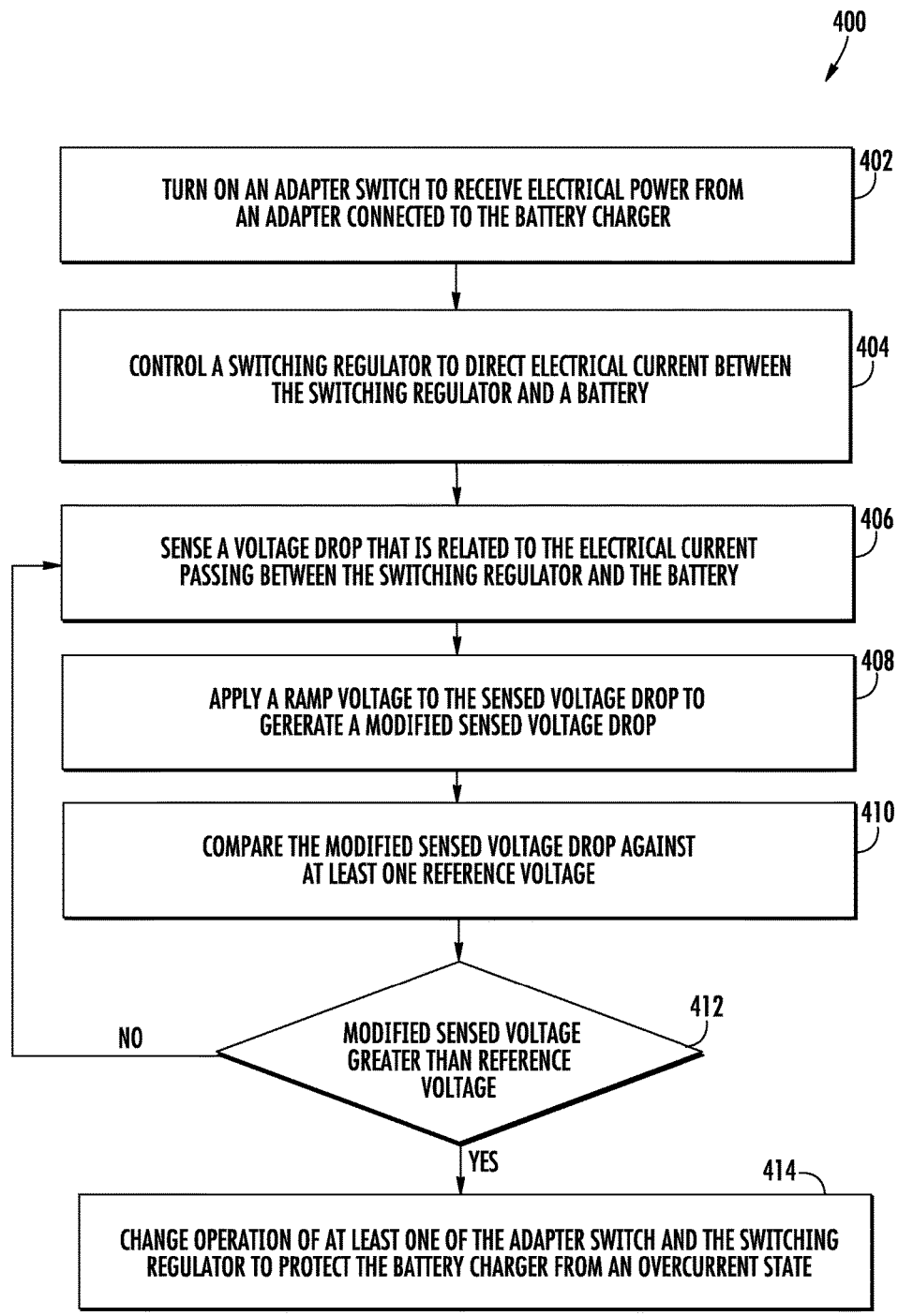
FIG. 4 is a flow diagram of a method for providing protections against excessive current in a battery charger in one embodiment described in the present disclosure.

FIG. 4 is a flow diagram of a method 400 for detecting an overcurrent state in a battery charger. Method 400 proceeds at 402, where an adapter switch is turned on to receive electrical power from an adapter connected to the battery charger. For example, in certain embodiments, a battery charger may be connected to an adapter. The adapter receives power from a power source and adapts the received electrical power for use by the battery charger and other components connected to the battery charger. In at least one implementation, the battery charger is connected to a system load and a battery. To control when the power is received from the adapter, the battery charger includes a controllable adapter switch that can be turned on to allow current to flow through the adapter switch and turned off to prevent current from flowing through the adapter switch. The adapter switch may be controlled by an adapter switch logic component.

In certain implementations, method 400 proceeds at 404 where a switching regulator is controlled to direct electrical current between the switching regulator and a battery. For example, when the adapter switch is turned on, current may pass to the system load. Also, a switching regulator, controlled by a PWM logic, may control a series of switches to either direct current to flow to or from the battery. Method 400 proceeds at 406 where a voltage drop that is related to the electrical current passing between the switching regulator and the battery is sensed. In at least one exemplary embodiment, the current passing between the switching regulator and the battery passes through sense resistor. In at least one implementation, the switching regulator includes an inductor through which the current passes from the switching regulator to the battery. Further, the sense resistor may be a precision resistor. A circuit is connected to the sense resistor such that the voltage on each node of the sense resistor is used as an input to the circuit. Method 400 proceeds at 408 where a ramp voltage is applied to the sensed voltage drop. For example, the sensed voltage drop is band limited when compared to the bandwidth of the inductor current signal, thus the operation of the switching regulator may be unstable. The applied ramp voltage is able to add some information back into the sensed voltage drop to more closely approximate the current that passes through the inductor.

Method 400 proceeds at 410 where the sensed voltage drop plus the added ramp voltage signal, forming a modified sensed voltage drop signal, is compared against at least one reference voltage. The circuit receives the inputs from the different nodes of the sense resistor and creates a signal proportional to the voltage difference between the two nodes. The proportional signal may then be compared against the reference voltage by a comparator. In at least one implementation, the reference voltage is also modified by adding a ramp signal to it, forming a modified reference voltage. Method 400 proceeds at 412 where it is determined whether the modified sensed voltage drop is greater than the at least one reference voltage. If the modified sensed voltage drop is less than the at least one reference voltage, method 400 proceeds to 406 where the battery charger continues to operate normally while continuing to monitor the sensed voltage drop across the sense resistor. If the sensed voltage drop is greater than the at least one reference voltage, method 400 proceeds at 414, where operation of the adapter switch is changed to protect the battery charger from an overcurrent state. For example, the adapter switch logic may turn off the adapter switch to prevent current from flowing into the battery charger. In certain alternative implementations, the PWM logic may direct the switching regulator to turn off switches that allow electrical current to flow between the battery and the switching regulator. Accordingly, when the current between the battery and the switching regulator exceeds a threshold, the battery charger senses that the battery charger is in an overcurrent state, where upon the battery charger includes protections to prevent damage to components in the battery charger and connected to the battery charger. The methods used to protect the battery charger from an overcurrent state depend on whether the battery is charging or discharging. Exemplary methods for protecting against overcurrent with regards to charging and discharging the battery are respectively described below in connection with FIGS. 5 and 6.

Figure 5:
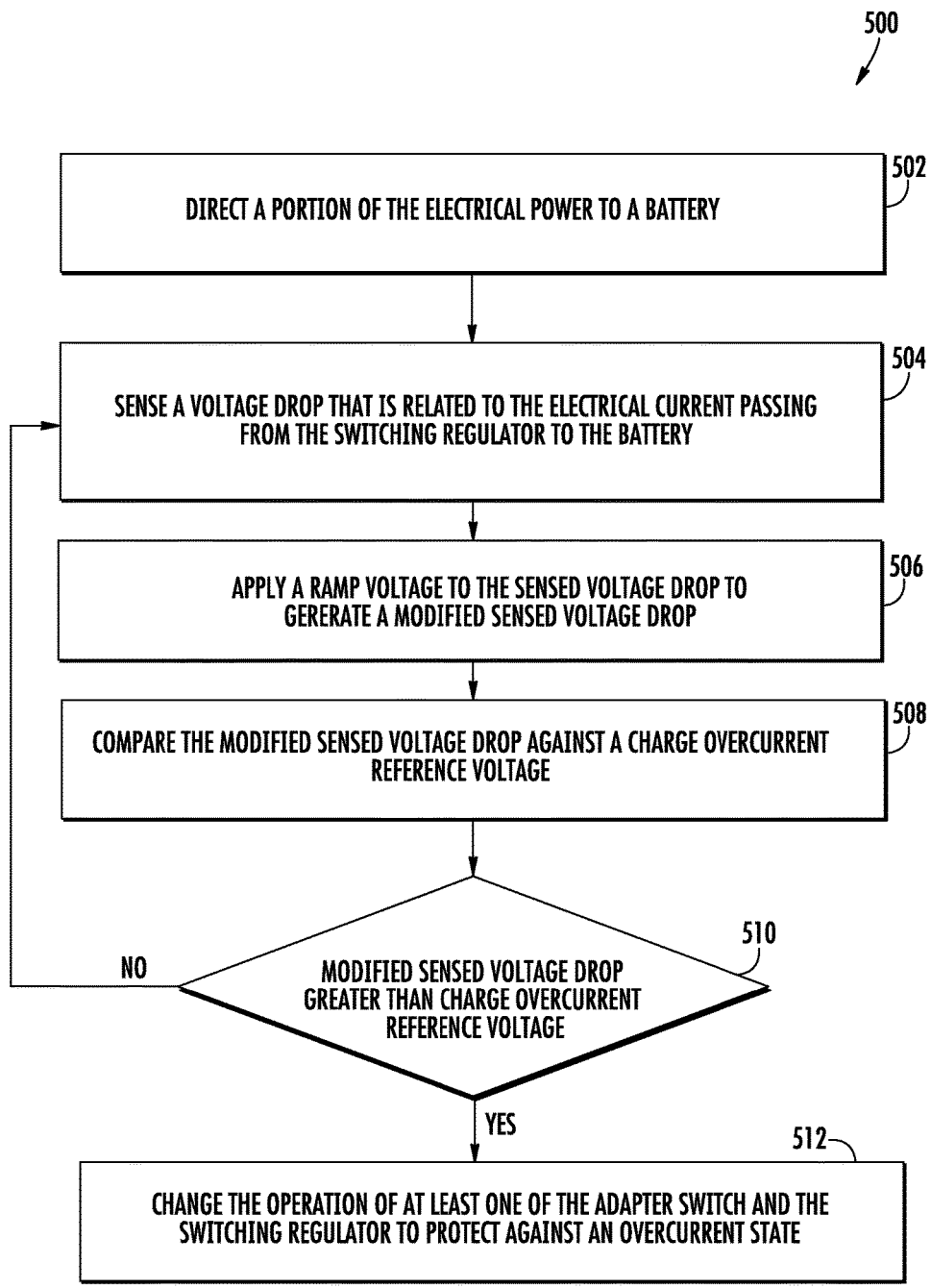
FIG. 5 is a flow diagram of a method for providing protections against excessive charge current in a battery charger in one embodiment described in the present disclosure.

FIG. 5 is a flow diagram of one embodiment of a method 500 for detecting overcurrent in a battery charger in implementations where the battery charger is providing current to the battery. Method 500 proceeds at 502, where a portion of the electrical current is directed to the battery. Method 500 proceeds at 504, where a voltage drop is sensed that is related to the electrical current passing from the switching regulator to the battery. For example, switches in the switching regulator turn on such that current from an adapter switch is directed through a sense resistor. The voltage drop across the sense resistor is monitored to determine when a charge overcurrent arises. Method 500 proceeds at 506 where a ramp voltage is applied to the sensed voltage drop, generating a modified sensed voltage drop. For example, the sensed voltage drop may be band limited when compared to the bandwidth of the inductor current signal, thus the operation of the switching regulator may be unstable. The applied ramp voltage is able to add some information back into the sensed voltage drop to more closely approximate the current that passes through the inductor. Method 500 proceeds at 508, where the modified sensed voltage drop is compared against a charge overcurrent reference voltage. For example, when the current is provided to the battery, a charge comparator will compare signals that are positive voltage drops across a sense resistor as the current moves towards the battery.

In certain implementations, method 500 proceeds at 510, where it is determined whether the voltage drop is greater than the charge overcurrent reference voltage. In at least one implementation, a comparison between the voltage drop and the charge overcurrent reference voltage is provided to a counter/filter that receives the comparison and determines whether the signal indicates that a overcurrent condition is present in the battery charger. Before the counter/filter provide the signal indicating the overcurrent condition to the PWM logic or the adapter switch logic, the counter/filter may monitor comparisons from a comparator for a programmable duration of time. If the counter/filter consistently receives a comparison signal from a comparator that compares the voltage drop against a charge overcurrent reference voltage, the counter/filter may provide a signal to the PWM logic or the adapter switch logic that indicates that the battery charger is presently in an overcurrent state. Alternatively, there may be a programmable number of comparisons in which a number of overcurrent comparisons are registered by the counter/filter before the counter/filter sends a signal to disable either the PWM logic or the adapter switch logic. For example, each time the counter/filter receives a comparison signal indicating an overcurrent condition, a counter is incremented until the programmed number of comparisons is reached. In certain implementations, the counter/filter may be cleared or reset periodically to prevent sporadic events from accumulating and resulting in a raised fault condition. If the sensed voltage drop is less than or equal to the charge overcurrent reference voltage, method 500 proceeds to 504. For example, if the comparison fails to indicate that an overcurrent state is present, then the battery charger continues to monitor the sensed voltage drop across the sense resistor for an overcurrent condition.

In at least one implementation, if the sensed voltage drop exceeds the charge overcurrent reference voltage, then method 500 proceeds at 512, where the operation of at least one of the adapter switch and the switching regulator is changed to protect against an overcurrent state. For example, the adapter switch may be turned off or the switching regulator may be controlled such that current is not provided through the sense resistor to the battery. In at least one implementation, the adapter switch logic may initially turn off the adapter switch upon the initial detection of an overcurrent state to protect against an overcurrent due to a failure in the switching regulator. The adapter switch logic then may gradually turn on the adapter switch by gradually increasing the current through the adapter. Alternatively, the PWM logic may turn off switches in the switching regulator upon an initial detection of an overcurrent state, if the overcurrent persists after the PWM logic has attempted to turn off the switches, the adapter switch logic may send a signal to turn off the adapter switch. If the PWM logic is unable to turn off switches in the switching regulator, it may indicate that a switch in the switching regulator is broken. Further, if the PWM logic is able to turn off the switches in the switching regulator, the adapter may still provide power to the system load, however the battery will not be able to receive current from the adapter. In at least one further implementation, after turning off either of the switches in the switching regulator or the adapter switch, the PWM logic and the adapter switch logic may periodically turn on the switches in the switching regulator and the adapter switch and proceed through method 500 again to determine if an overcurrent state is still present.

Figure 6:
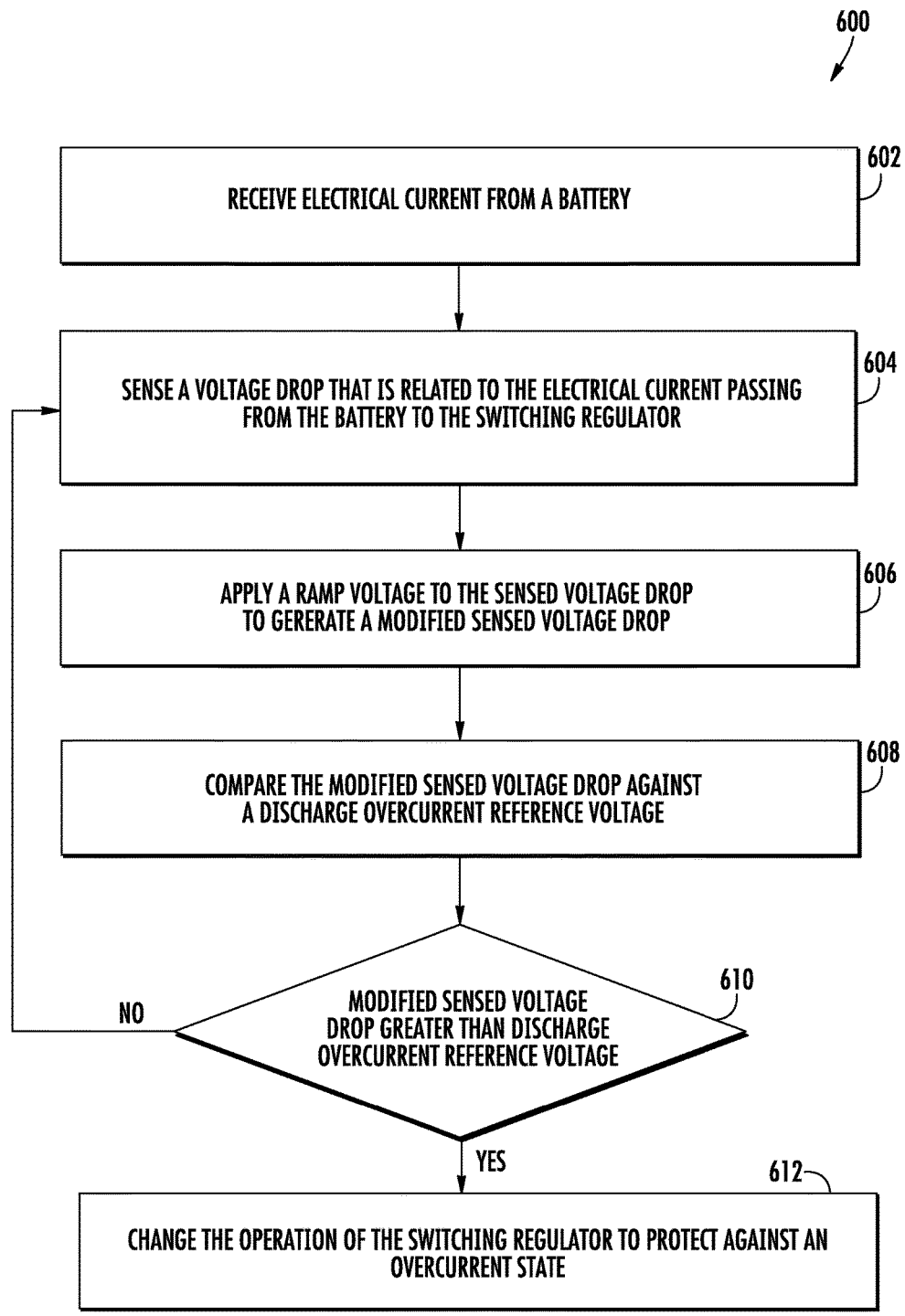
FIG. 6 is a flow diagram of a method for providing protections against excessive discharge current in a battery charger in one embodiment described in the present disclosure.

FIG. 6 is a flow diagram of a method 600 for detecting an overcurrent state in a battery charger in implementations where the battery is providing current to the battery charger. Method 600 proceeds at 602, where electrical current is received from the battery. Method 600 proceeds at 604, where a voltage drop is sensed that is related to the electrical current passing from the battery to the switching regulator. For example, switches in the switching regulator turn on such that current is drawn from the battery through a sense resistor. The voltage drop across the sense resistor is monitored to determine when a discharge overcurrent arises. Method 600 proceeds at 606 where a ramp voltage is added to the sensed voltage drop, generating a modified sensed voltage drop. For example, the sensed voltage drop is band limited when compared to the bandwidth of the inductor current signal, thus the operation of the switching regulator may be unstable. The applied ramp voltage is able to add some information back into the sensed voltage drop to more approximately be closer to current that passes through the inductor. Method 600 proceeds at 608, where the modified sensed voltage drop is compared against a discharge overcurrent reference voltage. For example, when the current is provided by the battery, a discharge comparator will compare signals that are positive voltage drops across a sense resistor as the current moves from the battery.

In certain implementations, method 600 proceeds at 610, where it is determined whether the voltage drop is greater than the discharge overcurrent reference voltage. In at least one implementation, a comparison between the voltage drop and the discharge overcurrent reference voltage is provided to a duty cycle filter that receives the comparison and determines whether the signal indicates that a overcurrent condition is present in the battery charger. For example, the duty cycle filter may provide a termination signal when the duty cycle for a comparison signal reaches 50%, which indicates that the termination signal will be sent when the average value of the discharge output signal exceeds the discharge overcurrent reference voltage. In alternative embodiments, the duty cycle filter may provide a termination signal when the duty cycle for the discharge comparison signal is less than 50%, particularly if a faster response to an overcurrent situation is desired. Also the duty cycle filter may provide a termination signal when the duty cycle for the discharge comparison signal is greater than 50%, for example, when multiple duty cycle levels are detected, the duty cycle filter may detect the 50% duty cycle and send the termination signal when the duty cycle filter detects a signal a certain percentage above 50%.

If the sensed voltage drop is less than or equal to the discharge overcurrent reference voltage, method 600 proceeds to 604. For example, if the comparison fails to indicate that an overcurrent state is present, then the battery charger continues to monitor the sensed voltage drop across the sense resistor for an overcurrent condition.

If the sensed voltage drop exceeds the discharge overcurrent reference voltage, then method 600 proceeds at 612, where the operation of the switching regulator is changed to protect against an overcurrent state. For example, as the battery is providing the current across the sense resistor and either no current is being provided by the adapter or the current provided by the adapter is consumed by the system load, to protect against a detected overcurrent from the discharging battery, the PWM logic disables switches in the switching regulator to prevent current from being drawn from the battery. In at least one further implementation, after turning off the switches in the switching regulator, the PWM logic may periodically turn on the switches in the switching regulator and proceed through method 600 again to determine if an overcurrent state is still present.

Example Embodiments

Example 1 includes a method for overcurrent protection in a battery charger, the method comprising: controlling a switching regulator to direct electrical current between the switching regulator and a battery port; sensing a voltage drop that is related to the electrical current passing between the switching regulator and the battery port; applying a first ramp voltage to the sensed voltage drop generating a modified sensed voltage drop; comparing the modified sensed voltage drop against at least one reference voltage; and when the modified sensed voltage drop exceeds the at least one reference voltage, changing operation of the switching regulator to protect the battery charger from an overcurrent state.

Example 2 includes the method of Example 1, wherein the method further comprises adding a second ramp voltage to the at least one reference voltage, whereby the second ramp voltage may or may not be different from the first ramp voltage.

Example 3 includes the method of any of Examples 1-2, wherein the method further comprises: turning on an adapter switch coupled between an output of an adapter and an input of the battery charger; and when the modified sensed voltage exceeds the reference voltage, changing operation of the adapter switch to protect the battery charger from an overcurrent state.

Example 4 includes the method of any of Examples 1-3, further comprising controlling the switching regulator to provide a portion of the electrical power to the system load port from the battery.

Example 5 includes the method of any of Examples 1-4, wherein the method further comprises at least one of: turning off a switch in the switching regulator such that a portion of the electrical current is not provided to the battery port; and periodically turning on the switch in the switching regulator to check for the overcurrent.

Example 6 includes the method of any of Examples 1-5, wherein comparing the voltage drop against the overcurrent reference voltage further comprises amplifying the voltage drop across a sense resistor.

Example 7 includes the method of any of Examples 1-6, wherein comparing the modified sensed voltage drop against the at least one reference voltage comprises at least one of: determining if the electrical current is an overcurrent for a programmed duration of time; and determining if the electrical current is an overcurrent for a programmed number of comparisons.

Example 8 includes the method of Example 7, wherein determining whether the electrical current is an overcurrent for a programmed number of comparisons comprises: incrementing a counter when a measurement indicates that a charge comparison output exceeds the reference voltage until the counter equals the programmed number of comparisons; periodically clearing the counter.

Example 9 includes the method of any of Examples 1-8, wherein the reference voltage is at least one of: a charge overcurrent reference voltage, wherein the modified sensed voltage is compared against the charge overcurrent reference voltage when current is provided from the switching regulator to the battery port; and a discharge overcurrent reference voltage, wherein the modified sensed voltage drop is compared against the discharge overcurrent reference voltage when current is received from the battery port to the switching regulator.

Example 10 includes the method of Example 9, wherein the modified sensed voltage exceeds the discharge overcurrent reference voltage when a duty cycle of the voltage drop exceeds a threshold value.

Example 11 includes the method of any of Examples 9-10, wherein the method further comprises changing operation of the switching regulator to protect the battery charger from an overcurrent state sensed by comparing the modified sensed voltage drop against the discharge overcurrent reference voltage by turning off a switch in the switching regulator to prevent current from passing from the battery to the switching regulator.

Example 12 includes a circuit for overcurrent protection, the circuit comprising: at least one switching regulator input node coupled to receive a switching regulator voltage proportional to a current provided by a switching regulator, wherein the switching regulator is capable of directing a portion of current provided through an adapter switch to at least one of a system load port and a battery port; at least one sense resistor input node coupled to receive a sense resistor voltage proportional to the current provided by the switching regulator through a sense resistor; at least one amplifier configured to provide an output signal proportional to the difference between the switching regulator voltage and the sense resistor voltage; a ramp voltage generator configured to generate a ramp voltage; at least one summer configured to add the ramp voltage to the output signal generating a modified output signal; and at least one threshold comparator configured to provide a comparison signal based on the comparison of the modified output signal against an overcurrent reference voltage, wherein the comparison signal is used to control the adapter switch.

Example 13 includes the circuit of Example 12, wherein the at least one summer is further configured to add a second ramp voltage to the overcurrent reference voltage whereby the second ramp voltage may or may not be different from the ramp voltage.

Example 14 includes the circuit of any of Examples 12-13, wherein the at least one amplifier comprises a charge amplifier configured to be capable of providing a charge output signal proportional to the difference between the switching regulator voltage and the sense resistor voltage when current is provided to the battery port; wherein the at least one threshold comparator comprises a charge threshold comparator, the charge threshold comparator providing a charge comparison signal when current is provided to the battery port based on the comparison of the charge output signal with the added ramp voltage against a charge overcurrent reference voltage.

Example 15 includes the circuit of Example 14, wherein an overcurrent state exists when the charge output signal with the added ramp voltage exceeds the charge overcurrent reference.

Example 16 includes the circuit of Example 15, further comprising at least one of: an adapter switch logic that controls the adapter switch, the adapter switch logic turning off the adapter switch when a fault condition exists; and a pulse width modulation logic that controls the switching regulator, the pulse width modulation disabling electrical paths through the sense resistor when a fault condition exists.

Example 17 includes the circuit of Example 16, wherein the adapter switch logic gradually increases current allowed through the adapter switch when the adapter switch logic turns on the adapter switch.

Example 18 includes the circuit of any of Examples 15-17, wherein a fault condition exists when the charge output signal with the added ramp voltage exceeds the charge overcurrent reference voltage for at least one of: a programmed duration of time; and a programmed number of comparisons.

Example 19 includes the circuit of Example 18, wherein a counter increments up to the programmed number of comparisons, wherein the counter is periodically cleared.

Example 20 includes the circuit of any of Examples 12-19, wherein the at least one amplifier comprises a discharge amplifier configured to provide a discharge output signal proportional to the difference between the sense resistor voltage and the switching regulator voltage when current is received from the battery port; wherein the at least one threshold comparator comprises a discharge threshold comparator, the discharge threshold comparator providing a discharge comparison signal when current is received from the battery port based on the comparison of the discharge output signal with the added ramp voltage against a discharge overcurrent reference voltage.

Example 21 includes the circuit of Example 20, wherein a pulse width modulation logic directs the switching regulator to disable electrical paths through the sense resistor when at least one of the discharge output signal with the added ramp voltage exceeds the discharge overcurrent reference voltage and when a comparator-duty cycle exceeds a specified value.

Example 22 includes the circuit of Example 21, wherein the pulse width modulation logic controls the ramp a voltage generated by the ramp voltage generator.

Example 23 includes the circuit of any of Examples 12-22, wherein a first filter couples the switching regulator voltage to the at least one switching regulator voltage and a second filter couples the sense resistor voltage to the at least one sense resistor node, wherein the first filter and the second filter have different time constants.

Example 24 includes the circuit of any of Examples 12-23, wherein the switching regulator comprises: an upper switch coupled to the adapter switch; a lower switch coupled to the upper switch; and an inductor coupled to the upper switch, the lower switch, and the sense resistor.

Example 25 includes a system for a battery powered system load, the system comprising: an adapter, the adapter connectable to a power source, wherein the adapter alters current provided by the power source; a battery configured to store a portion of energy provided by the power source and to provide stored energy; a system load configured to use current provided by the power source and current provided by a portion of stored energy in the battery; and a switching regulator coupled between the adapter, the battery, and the system load comprising: an adapter switch configured to control access to the power provided by the adapter; a battery switch configured to control discharging of the stored energy provided by the battery in case the adapter is not connected to the battery charger and to the system load; a switching regulator controller configured to control the adapter switch and one of the portion of stored energy in the battery provided by the battery to the system load and a charge current provided to the battery; a sense resistor coupled between the switching regulator and the battery; and a monitor and control circuit configured to monitor the voltage drop across the sense resistor to determine when the switching regulator is in an overcurrent state.

Example 26 includes the switching regulator controller of Example 25, further comprising: a ramp voltage generator configured to generate a first ramp voltage; at least one amplifier configured to provide an output signal proportional to the voltage drop across the sense resistor; at least one summer configured to add the first ramp voltage to the output signal thereby generating a modified output signal; at least one reference summer configured to add a second ramp voltage to an overcurrent reference voltage thereby generating a modified overcurrent reference voltage; and at least one threshold comparator configured to compare the modified output signal against the modified overcurrent reference voltage, wherein the comparison signal is provided to control the switching regulator.

Example 27 includes the switching regulator controller of Example 26, whereby either the first ramp voltage or the second ramp voltage or both ramp voltages have zero amplitude.

Example 28 includes the switching regulator of any of Examples 25-27, whereby in an overcurrent state the controller limits one of the battery charge current and a battery discharge current representative of the portion of stored energy in the battery provided by the battery to the system load.

Example 29 includes the switching regulator controller of any of Examples 25-28, whereby the controller disables the adapter switch in an overcurrent state when the switching regulator provides a charge current to the battery.

Example 30 includes a method for overcurrent protection in a battery charger, the method comprising: turning on an adapter switch to receive electrical power from an adapter connected to the battery charger; controlling a switching regulator to direct electrical current between the switching regulator and a battery port; sensing a voltage drop that is related to the electrical current passing between the switching regulator and the battery port; monitoring the sensed voltage drop to determine when the switching regulator is in an overcurrent state; and when the switching regulator is in an overcurrent state, changing operation of the adapter switch to protect the battery charger from the overcurrent state.

Example 31 includes the method of any of Examples 1-30, wherein the method further comprises at least one of: turning off a switch in the switching regulator such that the portion of the electrical current is not provided to the battery port; and periodically turning on the switch in the switching regulator to check for the overcurrent.

Example 32 includes the method of any of Examples 30-31, wherein a ramp voltage is applied to the switching regulator.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method for overcurrent protection in a battery charger, the method comprising:
   controlling a switching regulator to direct electrical current between the switching regulator and a battery port;
   sensing a voltage drop that is related to the electrical current passing between the switching regulator and the battery port;
   applying a first ramp voltage to the sensed voltage drop generating a modified sensed voltage drop;
   comparing the modified sensed voltage drop against at least one reference voltage; and
   when the modified sensed voltage drop exceeds the at least one reference voltage, changing operation of the switching regulator to protect the battery charger from an overcurrent state.

2. The method of claim 1, wherein the method further comprises adding a second ramp voltage to the at least one reference voltage, whereby the second ramp voltage may or may not be different from the first ramp voltage.

3. The method of claim 1, wherein the method further comprises:
   turning on an adapter switch coupled between an output of an adapter and an input of the battery charger; and
   when the modified sensed voltage exceeds the reference voltage, changing operation of the adapter switch to protect the battery charger from an overcurrent state.

4. The method of claim 1, further comprising controlling the switching regulator to provide a portion of the electrical power to the system load port from the battery.

5. The method of claim 1, wherein the method further comprises at least one of:
   turning off a switch in the switching regulator such that a portion of the electrical current is not provided to the battery port; and
   periodically turning on the switch in the switching regulator to check for the overcurrent.

6. The method of claim 1, wherein comparing the voltage drop against the overcurrent reference voltage further comprises amplifying the voltage drop across a sense resistor.

7. The method of claim 1, wherein comparing the modified sensed voltage drop against the at least one reference voltage comprises at least one of:
   determining if the electrical current is an overcurrent for a programmed duration of time; and
   determining if the electrical current is an overcurrent for a programmed number of comparisons.

8. The method of claim 7, wherein determining whether the electrical current is an overcurrent for a programmed number of comparisons comprises:
   incrementing a counter when a measurement indicates that a charge comparison output exceeds the reference voltage until the counter equals the programmed number of comparisons;
   periodically clearing the counter.

9. The method of claim 1, wherein the reference voltage is at least one of:
   a charge overcurrent reference voltage, wherein the modified sensed voltage is compared against the charge overcurrent reference voltage when current is provided from the switching regulator to the battery port; and
   a discharge overcurrent reference voltage, wherein the modified sensed voltage drop is compared against the discharge overcurrent reference voltage when current is received from the battery port to the switching regulator.

10. The method of claim 9, wherein the modified sensed voltage exceeds the discharge overcurrent reference voltage when a duty cycle of the voltage drop exceeds a threshold value.

11. The method of claim 9, wherein the method further comprises changing operation of the switching regulator to protect the battery charger from an overcurrent state sensed by comparing the modified sensed voltage drop against the discharge overcurrent reference voltage by turning off a switch in the switching regulator to prevent current from passing from the battery to the switching regulator.

12. A circuit for overcurrent protection, the circuit comprising:
   at least one switching regulator input node coupled to receive a switching regulator voltage proportional to a current provided by a switching regulator, wherein the switching regulator is capable of directing a portion of current provided through an adapter switch to at least one of a system load port and a battery port;
   at least one sense resistor input node coupled to receive a sense resistor voltage proportional to the current provided by the switching regulator through a sense resistor;
   at least one amplifier configured to provide an output signal proportional to the difference between the switching regulator voltage and the sense resistor voltage;
   a ramp voltage generator configured to generate a ramp voltage;
   at least one summer configured to add the ramp voltage to the output signal generating a modified output signal; and
   at least one threshold comparator configured to provide a comparison signal based on the comparison of the modified output signal against an overcurrent reference voltage, wherein the comparison signal is used to control the adapter switch.

13. The circuit of claim 12, wherein the at least one summer is further configured to add a second ramp voltage to the overcurrent reference voltage whereby the second ramp voltage may or may not be different from the ramp voltage.

14. The circuit of claim 12, wherein the at least one amplifier comprises a charge amplifier configured to be capable of providing a charge output signal proportional to the difference between the switching regulator voltage and the sense resistor voltage when current is provided to the battery port;
   wherein the at least one threshold comparator comprises a charge threshold comparator, the charge threshold comparator providing a charge comparison signal when current is provided to the battery port based on the comparison of the charge output signal with the added ramp voltage against a charge overcurrent reference voltage.

15. The circuit of claim 14, wherein an overcurrent state exists when the charge output signal with the added ramp voltage exceeds the charge overcurrent reference.

16. The circuit of claim 15, further comprising at least one of:
   an adapter switch logic that controls the adapter switch, the adapter switch logic turning off the adapter switch when a fault condition exists; and
   a pulse width modulation logic that controls the switching regulator, the pulse width modulation disabling electrical paths through the sense resistor when a fault condition exists.

17. The circuit of claim 16, wherein the adapter switch logic gradually increases current allowed through the adapter switch when the adapter switch logic turns on the adapter switch.

18. The circuit of claim 15, wherein a fault condition exists when the charge output signal with the added ramp voltage exceeds the charge overcurrent reference voltage for at least one of:
   a programmed duration of time; and
   a programmed number of comparisons.

19. The circuit of claim 18, wherein a counter increments up to the programmed number of comparisons, wherein the counter is periodically cleared.

20. The circuit of claim 12, wherein the at least one amplifier comprises a discharge amplifier configured to provide a discharge output signal proportional to the difference between the sense resistor voltage and the switching regulator voltage when current is received from the battery port;
   wherein the at least one threshold comparator comprises a discharge threshold comparator, the discharge threshold comparator providing a discharge comparison signal when current is received from the battery port based on the comparison of the discharge output signal with the added ramp voltage against a discharge overcurrent reference voltage.

21. The circuit of claim 20, wherein a pulse width modulation logic directs the switching regulator to disable electrical paths through the sense resistor when at least one of the discharge output signal with the added ramp voltage exceeds the discharge overcurrent reference voltage and when a comparator-duty cycle exceeds a specified value.

22. The circuit of claim 21, wherein the pulse width modulation logic controls the ramp a voltage generated by the ramp voltage generator.

23. The circuit of claim 12, wherein a first filter couples the switching regulator voltage to the at least one switching regulator voltage and a second filter couples the sense resistor voltage to the at least one sense resistor node, wherein the first filter and the second filter have different time constants.

24. The circuit of claim 12, wherein the switching regulator comprises:
   an upper switch coupled to the adapter switch;
   a lower switch coupled to the upper switch; and
   an inductor coupled to the upper switch, the lower switch, and the sense resistor.

25. A system for a battery powered system load, the system comprising:
   an adapter, the adapter connectable to a power source, wherein the adapter alters current provided by the power source;
   a battery configured to store a portion of energy provided by the power source and to provide stored energy;
   a system load configured to use current provided by the power source and current provided by a portion of stored energy in the battery; and
   a switching regulator coupled between the adapter, the battery, and the system load comprising:
      an adapter switch configured to control access to the power provided by the adapter;

a battery switch configured to control discharging of the stored energy provided by the battery in case the adapter is not connected to the battery charger and to the system load;

a switching regulator controller configured to control the adapter switch and one of the portion of stored energy in the battery provided by the battery to the system load and a charge current provided to the battery;

a sense resistor coupled between the switching regulator and the battery; and a monitor and control circuit configured to monitor the voltage drop across the sense resistor to determine when the switching regulator is in an overcurrent state.

26. The system of claim 25, wherein the switching regulator controller further comprises:

a ramp voltage generator configured to generate a first ramp voltage;

at least one amplifier configured to provide an output signal proportional to the voltage drop across the sense resistor;

at least one summer configured to add the first ramp voltage to the output signal thereby generating a modified output signal;

at least one reference summer configured to add a second ramp voltage to an overcurrent reference voltage thereby generating a modified overcurrent reference voltage; and at least one threshold comparator configured to compare the modified output signal against the modified overcurrent reference voltage, wherein the comparison signal is provided to control the switching regulator.

27. The system of claim 26, whereby either the first ramp voltage or the second ramp voltage or both ramp voltages have zero amplitude.

28. The system of claim 25, whereby in an overcurrent state the controller limits one of the battery charge current and a battery discharge current representative of the portion of stored energy in the battery provided by the battery to the system load.

29. The system of claim 25, whereby the controller disables the adapter switch in an overcurrent state when the switching regulator provides a charge current to the battery.

30. A method for overcurrent protection in a battery charger, the method comprising:

turning on an adapter switch to receive electrical power from an adapter connected to the battery charger;

controlling a switching regulator to direct electrical current between the switching regulator and a battery port;

sensing a voltage drop that is related to the electrical current passing between the switching regulator and the battery port;

monitoring the sensed voltage drop to determine when the switching regulator is in an overcurrent state; and when the switching regulator is in an overcurrent state, changing operation of the adapter switch to protect the battery charger from the overcurrent state.

31. The method of claim 1, wherein the method further comprises at least one of:

turning off a switch in the switching regulator such that the portion of the electrical current is not provided to the battery port; and periodically turning on the switch in the switching regulator to check for the overcurrent.

32. The method of claim 30, wherein a ramp voltage is applied to the switching regulator.

* * * * *